UNITED STATES PATENT OFFICE.

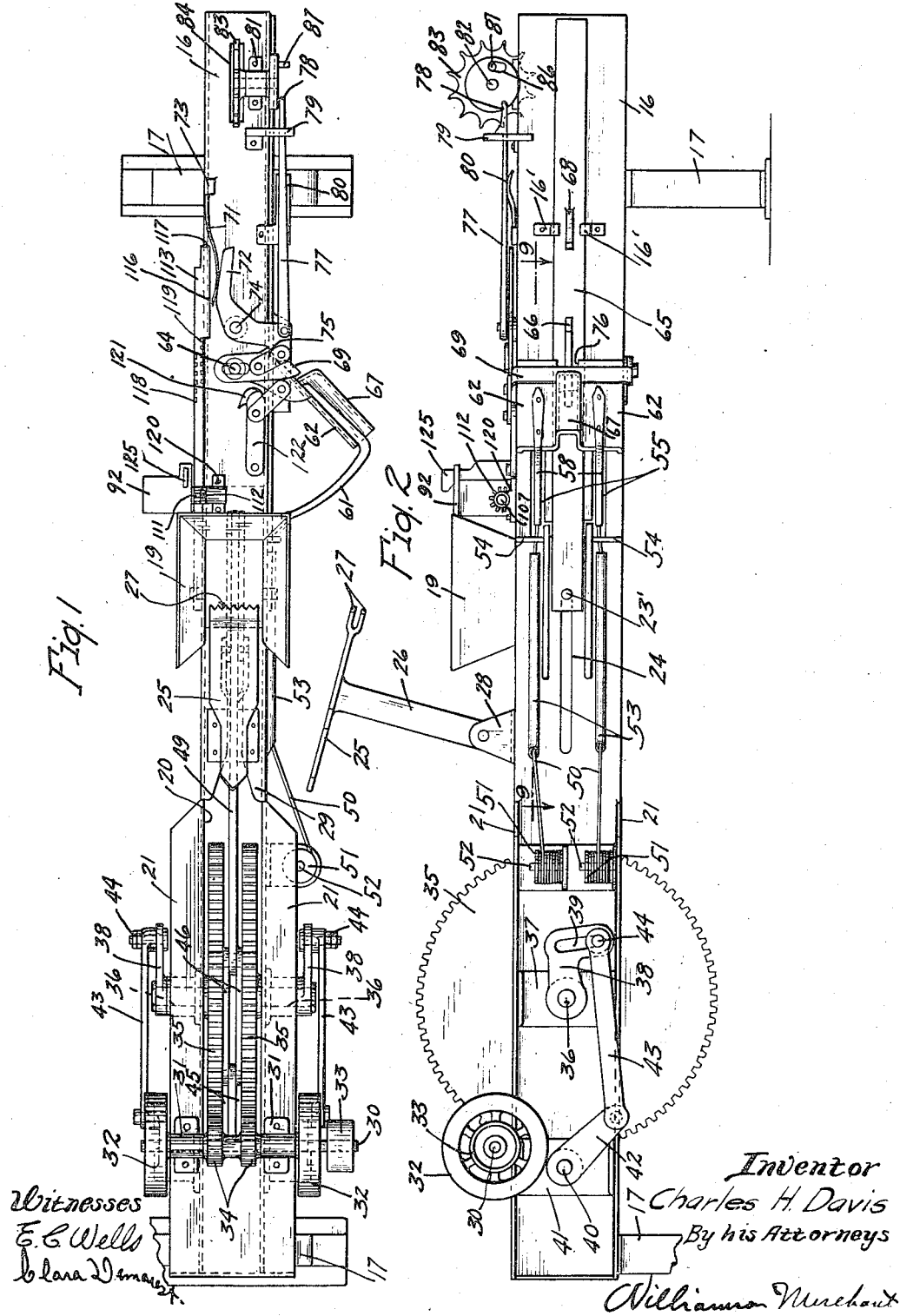

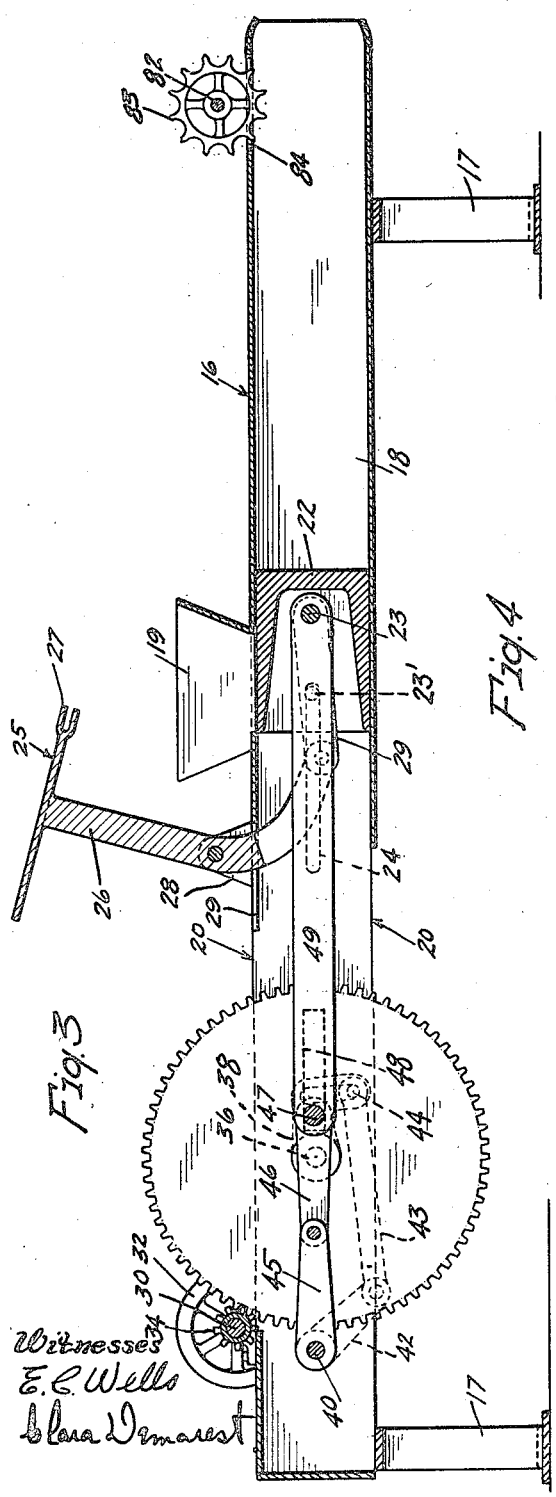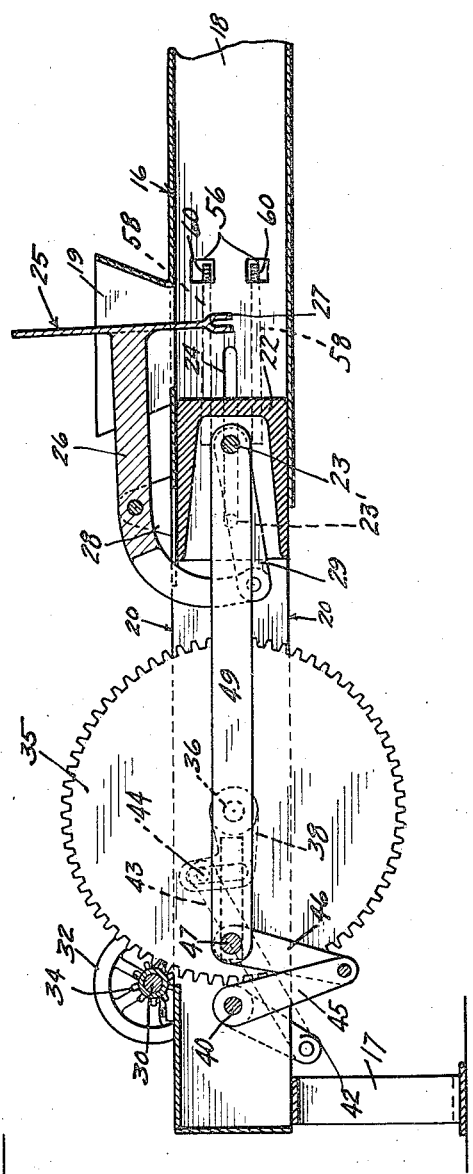

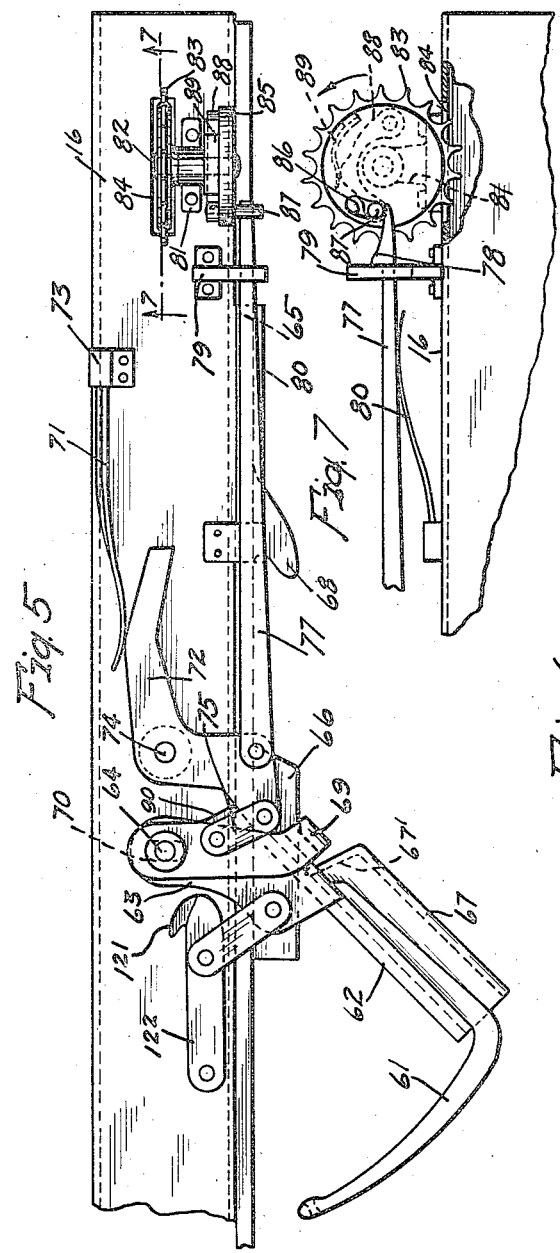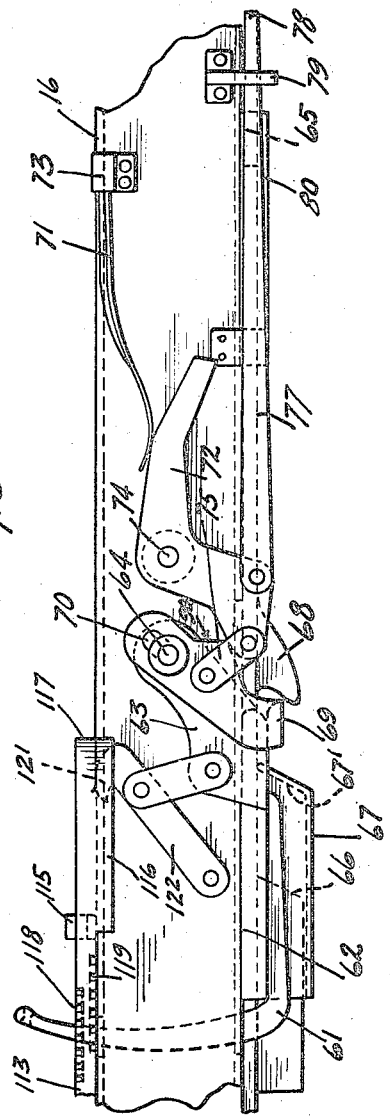

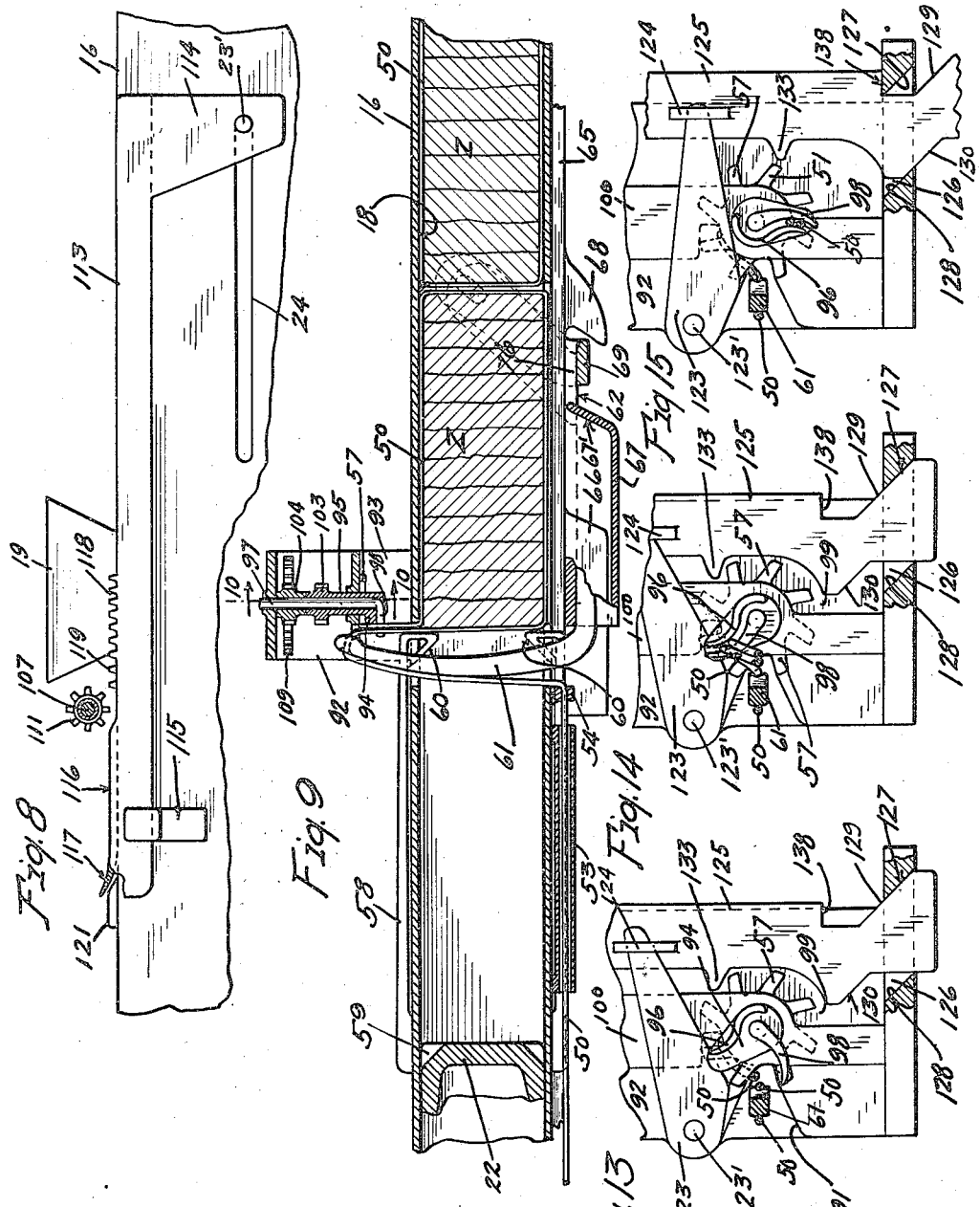

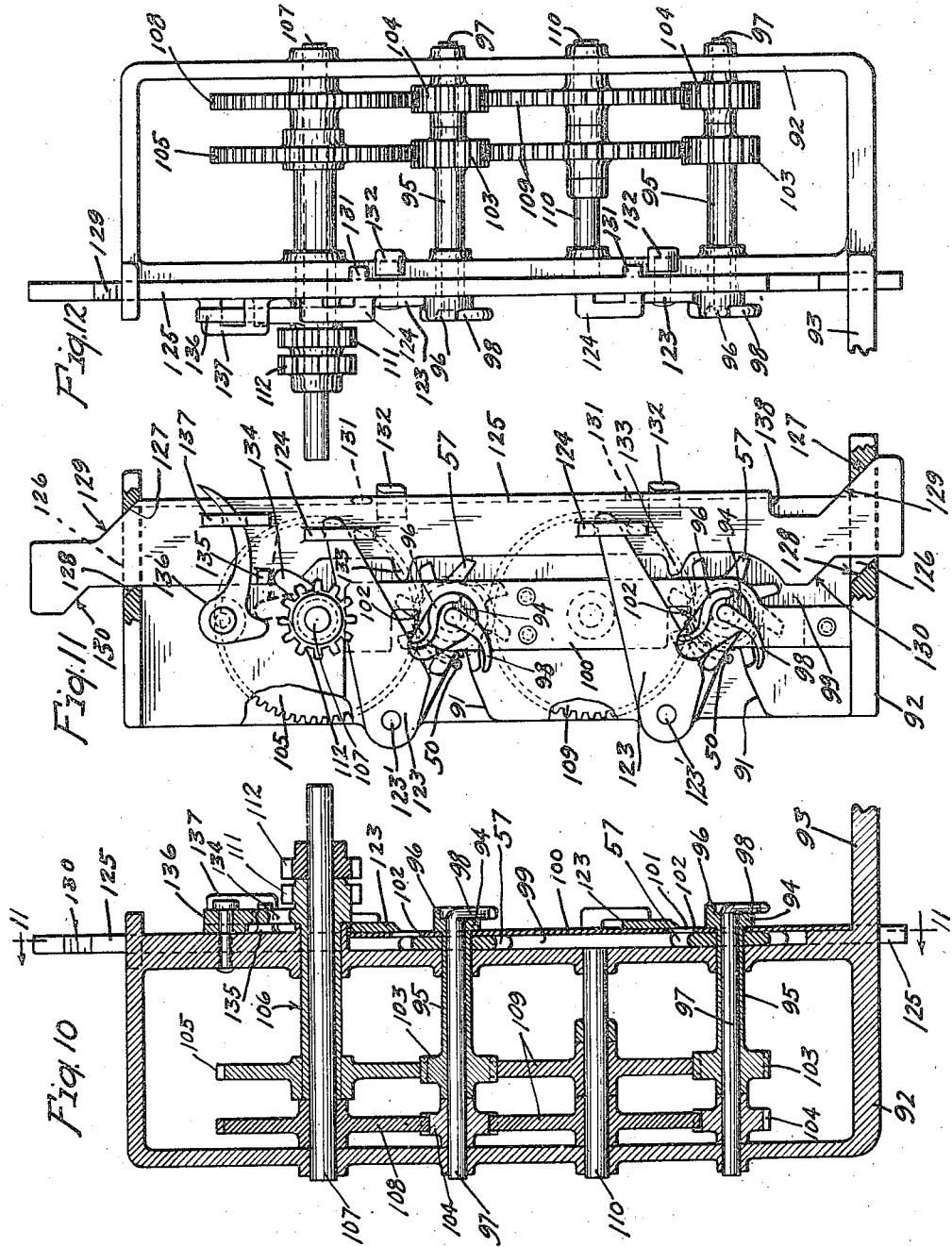

CHARLES HENRY DAVIS, OF REYNOLDS, NORTH DAKOTA.

HAY-PRESS.

1,297,450.             Specification of Letters Patent.      Patented Mar. 18, 1919.

Application filed April 2, 1917. Serial No. 159,076.

*To all whom it may concern:*

Be it known that I, CHARLES HENRY DAVIS, a citizen of the United States, residing at Reynolds, in the county of Grand Forks and State of North Dakota, have invented certain new and useful Improvements in Hay-Presses; and I do hereby declare the following to be a full, clear, and exact description of the invention, such as will enable others skilled in the art to which it appertains to make and use the same.

My invention relates to improvements in hay presses and the like; and, to this end, it consists of the noval devices and combinations of devices hereinafter described and defined in the claims.

In the accompanying drawings, which illustrate the invention, like characters indicate like parts throughout the several views.

Referring to the drawings,

Figure 1 is a plan view of the hay press;

Fig. 2 is a right side elevation of the same;

Fig. 3 is a longitudinal central section with some parts removed;

Fig. 4 is a view of the inner end portion of the hay press, as shown in Fig. 3, with the exception that certain parts are shown in different positions;

Fig. 5 is a plan view of the outer end portion of the hay press with the parts as shown in Fig. 1, but on an enlarged scale;

Fig. 6 is a view corresponding to Fig. 5, with the exception that certain parts are shown in different positions;

Fig. 7 is a fragmentary detail view, principally in side elevation, with some parts sectioned on the line 7—7 of Fig. 5;

Fig. 8 is a fragmentary left side elevation of the hay press;

Fig. 9 is a fragmentary view in horizontal section, taken on the line 9—9 of Fig. 2, on an enlarged scale;

Fig. 10 is a view principally in vertical section, taken on the line 10—10 of Fig. 9, on an enlarged scale;

Fig. 11 is an inside elevation of the parts shown in Fig. 10, with some parts sectioned on the line 11—11 of Fig. 10;

Fig. 12 is an elevation of the parts shown in Fig. 10, as viewed from the inner end of the hay press; and Figs. 13, 14 and 15 are fragmentary detail views of certain of the parts shown in Fig. 11 moved into different position.

The numeral 16 indicates a tubular frame that is rectangular in cross section and supported in a horizontal position on pairs of legs 17. One end of the frame 16 affords a compression chamber 18 in which the hay is baled. Formed on the top of the frame 16 at substantially the longitudinal center thereof, is a feed hopper 19 that opens into the receiving end of the compression chamber 18. The four walls of the compression chamber 18, at the extreme outer ends thereof, are preferably contracted, as shown, to increase their frictional contact with the hay, while the same is being compressed to form a bale. Rearward of the feed hopper 19, portions of the top and bottom of the frame 16 are removed to afford openings 20. The sides of the frame 16, at these openings 20, are reinforced by upper and lower flanges 21, which extend horizontally outward.

A cup-like plunger 22 is mounted in the compression chamber 18, for both rearward and forward movements past the open bottom of the feed hopper 19. This plunger 22 has secured therein a transverse pin 23, and a pair of pins 23', the ends of which extend through longitudinally extended slots 24 formed in the sides of the frame 16. Cooperating with the plunger 22, is a feed head 25 arranged to press the hay, placed in the hopper 19 by a fork or otherwise, into the compression chamber 18 in front of said plunger, when in its retracted position. The feed head 25 is in the form of a flat plate intermediately secured to the forward end of an operating lever 26 and having, at its lower end, a double row of teeth 27. The operating lever 26 is intermediately fulcrumed to and between a pair of lugs 28 on the top of the frame 16, just rearward of the feed hopper 19. The rear end of the operating levers 26 is curved downward and works in the top opening 20 and notch 29 in the top of the frame 16. A pair of parallel links 29 pivotally connect the rear end of the lever 26 with the plunger pin 23.

All of the movable parts of the hay press are operated from a transverse driving shaft 30 journaled in bearings 31 secured on top of the frame 16, just rearward of the opening 20 therein. A fly wheel 32 is keyed to each end of the shaft 30 and also keyed to the right hand end of said shaft, outward of the respective fly wheel 32, is a pulley 33, over which runs the driving belt of a gas engine or other suitable motive power, not shown. Two laterally spaced pinions 34 are keyed to the intermediate portion of the shaft 30 and mesh with two large gear wheels 35, located in the frame 16 and extending through the top and bottom openings thereof. Each gear wheel 35 is rigidly secured to the inner end of a pair of axially alined stub shafts 36, which extend through the sides of the frame 16 and are journaled in bearings 37 secured thereto. On the outer projecting end of each stub shaft 36, is rigidly secured one of the arms of a bell-crank lever 38, and in the other arms of said levers are formed longitudinally extended slots 39.

Extending transversely through the frame 16, slightly rearward of the shaft 30, is a rock shaft 40 journaled in bearings 41 secured to the sides of said frame. Rigidly secured to each end of the shaft 40, is a crank arm 42. Connecting rods 43 have one of their ends pivotally connected to the outer ends of the crank arms 42 and their other ends are connected to the outer arms of the bell-crank levers 38, with freedom for pivotal and sliding movement, by studs 44, which work in the respective slot 39. Rigidly secured to the intermediate portion of the rock shaft 40, is a radial arm 45, the outer end of which is pivotally connected, by a pair of parallel links 46, to the intermediate portion of a heavy crank pin 47 having its ends slidably mounted in a pair of opposite radial slots 48 formed, the one in each of the gears 35. A connecting bar 49 secures the pin 47 to the plunger pin 23.

Obviously, the driving connections, just described, impart reciprocating movements to the plunger 22 and feed head 25. It is also evident that the radially movable pin 47 and the gears 35 afford an automatic extensible throw-crank arranged to shorten, under the compression stroke of the plunger 22, and to lengthen, under the return stroke, thus producing a slow movement of the plunger, while during its work and quick movements thereof to and from the work. The sliding connections 39—44, between the bell-crank levers 38 and connecting bars 43, afford slip joints which compensate for the movement of the variable throw-crank, with respect to the driving shaft 30.

Two wires 50 are placed around each bale Z, during the formation thereof by the plunger 22, and after the completion of the bale, the wires are cut and the ends thereof twisted together. Each wire 50 is wound upon an independent spool 51, loosely mounted upon a spool-holding spindle 52. These spindles 52 are axially alined, vertically spaced, the one above the other, and rigidly secured to the right side of the frame 16, rearward of the feed hopper 19.

From the spools 51, the wires 50 extend parallel through long horizontal tubular guides 53, guide eyes 54, alined horizontal slots 55 and apertures 56 formed, respectively, in the right and left hand sides of the frame 16, and their ends are securely held by circumferentially notched holding wheels 57. These holding wheels 57 are located on the left hand end of the frame 16, just outward of the aperture 56, and will presently be more fully described. It is important to note that the ends of the slots 55 and apertures 56, nearest the spools 51, terminate directly opposite one another, and that the slots 55 are much longer than the apertures 56 and terminate at points substantially where the outer end of a completed bale will be. The tubular guide 53 and guide eye 54, for each wire 50, are alined with one of the slots 55 and secured to the same side of the frame 16 between the said slots 55 and the spools 51.

Just before each bale Z is started, the wires 50, held by the holding wheels 57, extend transversely through the compression chamber 18. As a bale is being formed in layers by the plunger 22 and moved thereby, step by step, in the compression chamber toward the delivery end thereof, the wires 50 are carried thereby. The wires 50 from the holding wheels 57 extend for a short distance transversely of the frame 16 and through the apertures 56, from thence, they extend between the bale and left hand wall of the compression chamber 18 and around the outer end of the bale and into the slots 55. With the wires 50 extending longitudinally through the slots 55, there is a direct pull thereon through the guides 53 and 54, which are alined therewith, and hence, no binding of the wires between the bale and right side wall of the compression chambers 18.

To prevent the last formed layer of the bale from being carried with the plunger 22, during its return stroke, there is secured to the outer face of each side of the frame 16 a pair of horizontal and forwardly projecting spring arms 58. These arms 58 are anchored, at their rear ends, to the frame 16 and have, at their free ends, shoulders which extend into the compression chamber 18 through the slots 55 and apertures 56. In the sides of the plunger 22, is a pair of vertically opposite cam notches 59, which engage cam surfaces 60 on the shoulders of the arms 58 and force said shoulders out of the compression chamber 18, during the compression stroke of said plunger. During the return stroke of the piston 22, the shoulders on the arms 58, yieldingly held against the sides of said plunger, enter the cam notches 59 and engage the last formed layer of the bale to prevent the same from following said plunger, in case the same may be stuck fast thereto.

After the plunger 22 has made the required number of strokes to complete a bale, the wires 50 are carried transversely through the compression chamber 18, over the inner end of the bale, by a pair of vertically spaced needles 61. These needles 61 are rigidly secured to the free end of a horizontal swinging plate 62, having hinge lugs 63 which extend, the one over and the other under the frame 16, and are pivotally secured thereto by a pair of vertically projecting and axially alined studs 64. The needle-carrying plate 62 is arranged to swing from an angular position, with respect to the frame 16, substantially parallel into flat arrangement therewith. The needles 61 are curved on the arc of a circle, having its center at the axis of the studs 64, and they are arranged to enter the slots 55 and pass through the compression chamber 18 and apertures 56. In the free ends of the needles 61, are eyes through which the wires 50 are extended.

The needle-carrying plate 62 is intermittently oscillated to carry the needles 61 to and from the wire holding wheels 57 by a reciprocating bar 65. One end of this bar 65 is attached to the projecting right hand end of the plunger pin 23' and is held for flat sliding engagement with the adjacent side of the frame 16 by a pair of keeper brackets 16' secured to the frame 16, near the delivery end thereof. The bar 65 works between the needle-carrying plate 62 and adjacent sides of the frame 16, and has, on its intermediate portion, a horizontal and outwardly projecting cam flange 66, which works in a channel 67 formed by pressing the intermediate portion of the needle-carrying plate 62 outward. The inner end of the channel 66 is closed to afford a cam surface 67' arranged to be engaged by the cam flange 66, during the compression stroke of the plunger 22, and thereby swing the needle-carrying plate 62 outward to retract the needles 61.

The needles 61 are moved through the compression chamber 18, during the return stroke of the plunger 22, by a cam finger 68 on the reciprocating bar 65 and is spaced apart from the outer end of the cam flange 66. This cam finger 68 is arranged to engage the intermediate portion of a U-shaped lock bar 69. The intermediate portion of this lock bar 69 extends over the needle-carrying plate 62 inward of its channel 67, and the prongs thereof overlap the hinge lugs of said plate and have formed therein longitudinally extended slots 70, through which the studs 64 project and connect the lock bar 69 thereto, for pivotal and sliding movements transversely of the frame 16.

The transverse portion of the lock bar 69 is yieldingly held onto the needle-carrying plate 62 by a leaf spring 71, acting through an intermediately fulcrumed lever 72. One end of the spring 71 is anchored in a lug 73 on the top of the frame 16 and its free end bears against the long arm of the lever 72, which is fulcrumed on a pin 74 secured to and projecting upward from the top of the said frame. A short link 75 pivotally connects the short end of the lever 72 to the upper prong of the lock bar 69. During the compression stroke of the plunger 22, the outer end of the cam flange 66, after completing the opening movement of the needle-carrying plate 62, passes under the cam surface 67', through a notch 76 in the inner end of said plate. A further continued movement of the cam flange 66 engages the intermediate portion of the lock bar 69 and moves said lock bar laterally away from the frame 16, against the tension of the spring 71, with sufficient clearance to permit the cam finger 68 to pass thereunder, during the return stroke of said plunger.

To temporarily secure the lock bar 69 in this position against the action of the spring 71, there is pivoted to the short end of the lever 72 a long spring arm 77, having on its free end a lock tooth 78, which works through an aperture in a coöperating lock plate 79 secured to the top of the frame 16. A leaf spring 80, anchored to the top of the frame 16, yieldingly holds the lock tooth 78 interlocked with the plate 79, when the arm 77 is projected.

Journaled in a bearing 81, on the top of the frame 16, at the delivery end of the compression chamber 18, is a short transverse shaft 82 having rigidly secured to its inner end a toothed wheel 83, the lower teeth of which pass through a longitudinal slot 84, in the top of the frame 16 and project into the compression chamber 18. The endwise movement of a finished bale Z in the compression chamber 18, as the same is forced, step by step, toward the delivery end of said chamber by the plunger 18, engages the toothed wheel 83 and imparts thereto a step by step movement.

On the outer end of the shaft 82, is rigidly secured a disk-like head 85, having near its periphery a segmental and eccentrically located slot 86, through which is extended a tripping pin 87. This tripping pin 87 is carried by the free end of a curved arm 88 pivoted to the head 85, at a diametrically opposite point from the slot 86. A leaf spring 89, anchored to the head 85, acting on the arm 88, presses the tripping pin 87 into the front end of the slot 86, with respect to the direction of rotation of said head, which is in the direction of the arrow marked on Fig. 7.

When the arm 77 is in a latched position, the outer end thereof projects in the path of movement of the tripping pin 87. Under the rotation of the toothed wheel 83, the tripping pin 87 is brought into engagement with the arm 77 and unlatches the same and thereby releases the lever 72. With the lever 72 released, the spring 71, acting on the long end thereof, forces the short end of said lever against a shoulder 90 on the upper prong of the lock bar 69 and moves said lock bar bodily toward the frame 16 and into a position in which the cam lug 68 will engage the transverse portion of said bar. This releasing of the arm 77 takes place, during the return movement of the plunger 22 and after the cam flange 66 is out of engagement with the cam surface 67' and lock bar 69. With the lock bar 69 in the path of movement of the cam finger 68, during the return movement of the plunger 22, the same is engaged by said cam finger and moved bodily toward the frame 16. This movement of the lock bar 69 carries with it the needle plate 62, which swings the needles 61 through the compression chamber 18. In case the tripping pin 87 engages the arm 77, before the cam flange 66 is entirely out of engagement with the cam surface 67' and lock bar 69, the same will stand still against the action of the spring 89 and permit the head 85 to move, in respect thereto, thus preventing undue strains or breaking of the parts.

When the needles 61 move through the compression chamber 18 toward the holding wheels 57, they carry with them the wires 50 and lay the same over the inner end of the finished bale Z. From the compression chamber 18, the needles 61 carry the wires 50 through the apertures 56, into parallel arrangement with the transverse end portions of said wires, held by the holding wheels 57, through one of the notches in each of said holding wheels and into V-shaped notches 91. These notches 91 are formed in one edge of the inner wall of a rectangular frame 92, that is secured to the frame 16 by providing the same with a lower end extension 93, which is bolted or otherwise rigidly secured to the bottom of the frame 16. The frame 92 is secured to the frame 16 with its inner face parallel to the adjacent side of the frame 16, but spaced apart therefrom. While the wires 50 are thus held by the needles 61, and before said needles start on their return movement, said wires are cut and the ends of the wires around the bales Z are secured together by twisting heads 94.

The twisting heads 94 are located between the frames 16 and 92 and are integrally formed on the inner ends of horizontal tubular shafts 95. Integral with the outer face of each twisting head 94, is a wire-holding flange 96. The shafts 95 are journaled in bearings formed in the inner wall of the frame 92 and on shafts 97 which, in turn, are journaled on the shafts 95 and in bearings formed in the outer wall of said frame. During the twisting of the wires 50 by the heads 94, said wires are clamped on the said heads and their flanges 96 by curved holding-fingers 98, integrally formed with the inner ends of the shafts 95.

The inner wall of the frame 92 is recessed at 99, under and between the twisting heads 94, and the wire-holding wheels 57 are mounted in said recess and loosely journaled on the shafts 95. A relatively narrow vertically extended cover plate 100 is interposed between the holding wheels 57 and twisting heads 94 and the shafts 95 are journaled in bores formed therein. This cover plate 100 is rigidly secured to the frame 92 and has formed therein, just above each shaft 95, a notch 101 with its lower edge arranged to afford a fixed wire-shearing blade 102.

Secured on the outer end of each shaft 95, for rotation therewith, is a pinion 103 and rigidly secured on each shaft 97, is a pinion 104. The upper pinion 103 is driven by a gear 105 secured on a tubular shaft 106 journaled in a bearing formed in the inner wall of the frame 92 and on a shaft 107 which, in turn, is journaled in the shaft 106 and a bearing formed in the outer wall of said frame. The upper pinion 104 is driven by a gear 108 on the shaft 107. The lower pinions 103 and 104 are driven from the corresponding upper pinions by idle gears 109 loosely journaled on a shaft 110, secured in the walls of the frame 92. On the inner end of the shaft 106, is a pinion 111 and on the inner end portion of the shaft 107, is a pinion 112.

The shafts 106 and 107 are intermittently rotated from the plunger 22 by a bar 113, having on its inner end a depending arm 114 pivoted to the left hand end of the plunger pin 23', and supports said bar, with freedom for vertical swinging movement. The other or free end of the bar 113 is slidably mounted in a keeper bracket 115, which permits said bar to partake of its vertical swinging movement. This keeper bracket 115 is secured to the left hand side of the frame 16. On the outer end of the bar 113, is an inwardly and laterally projecting lifting flange 116, which normally slides on the top of the frame 16. The outer end of the lifting flange 116 is upwardly curved to form a cam 117, the purpose of which will presently appear. Formed on top of the bar 113, just inward of the flange 116, are two parallel rows of inner and outer rack teeth 118 and 119, respectively. The shaft 107 extends transversely over the bar 113 and is journaled in a bearing 120 on the top of the frame 16, and which also assists in securing the frame 92 to the frame 16. The pinions 111 and 112 are located directly over the rack teeth 118 and 119, respectively, but normally out of mesh therewith.

The twisting heads 94 are given three complete rotations by lifting the bar 113 by bringing the rack teeth 118 and 119 thereof into mesh with the overlying pinions 111—112. This twisting movement of the heads 94 takes place, during the compression stroke of the plunger 22, and the bar 113 is lifted into mesh with the pinions 111—112 by a cam lug 121, integrally formed on the inner end of one of the members of a pair of toggle links 122. One member of the toggle links is pivotally connected to the upper hinge lug 63 and the other member thereof is pivoted to the top of the frame 16. When the needles 61 are in their retracted position, as shown in Fig. 1, the cam lug 121 is held in a retracted position. But during the limit of the projecting movement of the needles 61, the cam lug 121 is moved by the toggle link 122 into the path of movement of the flange 116 and under its cam surface 117.

As the bar 113 is moved under the compression stroke of the plunger 22, the cam surface 117 of said bar engages the cam lug 121 and lifts the teeth 118—119 into mesh with the pinion 111 and 112. It is important to note that the row of teeth 119, while of the same number as the row of teeth 118, are set slightly in advance thereof. With the teeth 118—119 thus arranged, the teeth 119 will first engage the pinion 112 and operate the driving connections for the shaft 97 to thereby cause the holding fingers to move onto the twisting heads 94 and clamp the wires 50 therebetween. While the wires 50 are thus held, the teeth 118 engage the pinion 111 and through the driving connections for the shaft 95 give the twisting heads 94 three complete rotations.

During the rotation of the twisting heads 94, the shafts 95 and 97 are rotated together and, at the same speed, thus keeping said twisting heads and holding fingers 98 together with the wires 50 clamped therebetween. Owing to the offset relation of the two rows of teeth 118—119, the teeth 119 first move out of mesh with the pinion 112, thus stopping the rotation of the holding fingers 98, and the continued rotation of the shaft 106 will carry the twisting heads 94 out of engagement with said holding fingers and thereby release the wires 50. This stopping of the twisting heads 94 and holding fingers 98 leaves the same circumferentially spaced to afford a clear opening therebetween for the needles 61, during their movements toward and from the holding wheels 57.

During the last rotation of the twisting heads 94, the wires 50, at points between the holding wheels 57 and said twisting heads, are cut by movable shearing blades 123, which coöperate with the fixed shearing blades 102. The movable shearing blades 123 are pivoted at 123' to the frame 92, just above the notches 91, and their free ends extend loosely through slotted lugs 124. These lugs 124 are formed with a vertically elongated plate 125 mounted in upper and lower slots 126 formed in the ends of the frame 92, with freedom for limited endwise and edgewise movements. The slots 126 are located in the same vertical plane with the wire-holding wheels 57 and the ends thereof are beveled to afford inner and outer cam surfaces 127 and 128 in each of said slots.

On the longitudinal edges of the plate 125, at each end thereof, are oblique cam surfaces 129 and 130, and which cam surfaces extend substantially parallel to the cam surfaces 127 and 128. Integrally formed with the outer edge portion of the plate 125, is a pair of vertically spaced lugs 131, and, on the adjacent edge of the inner wall of the frame 92, is a pair of coöperating cam lugs 132. Normally, the plate 125 is in a raised position and held by the coöperating cam surfaces 127 and 129 in its innermost position. In this position of the plate 125, the lugs 131 are above the cam lug 132 and arranged to pass inward thereof, during a downward movement of the said plate. Integrally formed with the inner edge of the plate 125, is a pair of vertically spaced lugs 133, located, when the plate 125 is raised, above the wire-holding wheels 57.

The plate 125 is held in a raised position by a cam finger 134 on the upper shaft 106, which engages a laterally projecting lug 135 on said plate. The initial rotation of the upper shaft 106 will carry the cam finger from under the lug 135 and into engagement with the short depending arm of a bell-crank lever 136 pivoted to the inner side of the frame 92. The long arm of the lever 136 is curved and extends substantially horizontally and loosely through a slotted lug 137 on the plate 125. The cam finger 134, acting upon the lever 136, will force the plate 125 downward, which will first carry the lugs 133 into contact with the wire-holding wheels 57 and impart a step of movement thereto, to thereby secure other holds on the wires 50, before the same are severed by the shearing members 102—123. This downward movement of the plate 125 also carries with it the shearing members 123, which sever the wires 50, after the step of movement has been imparted to the holding wheels 57.

During the initial downward movement of the plate 125, and while the step of movement is imparted to the wire-holding wheels 157 and the wires 50 are being severed by the blades 123, the said plate is held for vertical straight line movement against the inner ends of the slots 126 by the lugs 131, at which time they are moving inside of the lugs 132 and engage the same as stops. A further downward movement will carry the lugs 131 below the lugs 132 and the cam surfaces 130 into contact with the cam surfaces 128 to impart an edgewise movement to the plate 125 and thereby carry the lugs 133 out of engagement with the wire-holding wheels 57, as shown in Fig. 15. The downward movement of the plate 125 is limited by an under-cut shoulder 138, on the lower end of said plate and slightly above the lowermost cam surface 129, engaging the frame extension 93.

The upward movement of the plate 125 to its original position is imparted by the cam finger 134 engaging the lug 135. During the initial lifting movement of the plate 125, the lugs 131 move outside of the lugs 132 and thereby hold said plate against inward edgewise movement to keep the lugs 133 clear from the wire-holding wheels 57. By reference to Fig. 11, it will be noted that the upper and lower edges of the lugs 132 are reversely beveled to direct the lugs 131 on the proper side thereof, depending on which way the plate 125 is moving. A further upward movement of the plate 125, by the cam finger 134, will carry the cam surfaces 129 into contact with the cam surfaces 127, which will move the plate 125 inward against the inner ends of the slots 126. The cam surfaces 129 coöperate with the cam surfaces 127 to limit the upward movement of the plate 125.

In actual practice, anti-friction rollers may be mounted in the eyes of the needles over which the wires 50 run.

What I claim is:

1. In a press of the kind described, the combination with a frame having a compression chamber, of a plunger mounted in said chamber, driving connections for reciprocating the plunger, including a variable throw-crank that shortens under the compression stroke, and positive means for lengthening said crank under the return stroke.

2. In a press of the kind described, the combination with a frame having a compression chamber, of a plunger mounted in said chamber, a driving shaft having a pinion, a gear meshing with the pinion, a crank pin mounted on the gear with freedom for radial movement, a connecting bar between the plunger and crank pin, and positive means for moving the crank pin to lengthen the throw under the return stroke.

3. In a press of the kind described, the combination with a frame having a compression chamber, of a plunger mounted in said chamber, a driving shaft having a pinion, a gear meshing with said pinion, a crank pin mounted on the gear with freedom for radial movement, a connecting bar between said plunger and crank pin, and positive connections actuated by said gear for moving the crank pin to lengthen the throw under the compression stroke.

4. In a press of the kind described, the combination with a frame having a compression chamber, of a plunger mounted in said chamber, a driving shaft having a pinion, a gear meshing with said pinion, a crank pin mounted on the gear with freedom for radial movement, a connecting bar between said plunger and crank pin, and connections actuated by said gear for moving the crank pin to lengthen the throw under the compression stroke, said connections having a slip joint to compensate for said variable throw-crank pin.

5. In a press of the kind described, the combination with a frame having a compression chamber, of a plunger mounted in said chamber, a driving shaft having a pinion, a gear meshing with said pinion and having a crank arm, a crank pin mounted on the gear with freedom for radial movement and having a crank arm, a connecting bar between the plunger and crank pin, a rock shaft having a pair of crank arms, a link connecting the arm of the crank pin with one of the arms of the rock shaft, and a connecting bar having one of its ends pivotally attached to the other arm of the rock shaft and its other end attached by a slip joint to the crank arm on the gear.

6. In a press of the kind described, the combination with a frame having a compression chamber, of a plunger mounted in said chamber, a driving shaft having two pinions, a pair of laterally spaced gears meshing with said pinions and having axially alined outwardly projecting stub shafts, a crank arm on each stub shaft, said gears having a pair of radial slots, a crank pin mounted in said slots and having a crank arm, a connecting bar between the plunger and crank pin, a rock shaft having end and intermediate crank arms, a link connecting the arm of the crank pin with the intermediate arm of the rock shaft, and connecting bars having one of their ends pivotally attached to the arms on the ends of the rock shaft and their other end attached by slip joints to the crank arms on the gears.

7. In a press of the kind described, the combination with a frame having a compression chamber, of a reciprocating plunger mounted in said chamber, an oscillatory needle for carrying a wire in the path of the compression stroke of the plunger and over a finished bale, a wire twister for connecting the ends of the wire, a cam bar actuated by the plunger for moving the needle into a retracted position, means under yielding strain to move into the path of the cam bar and be operated thereby to project the needle, said means arranged to be moved into an inoperative position by the cam bar during its movement to retract the needle, and a latch for holding said means in an inoperative position.

8. In a press of the kind described, the combination with a frame having a compression chamber, of a reciprocating plunger mounted in said chamber, an oscillatory needle for carrying a wire in the path of the compression stroke of the plunger and over a finished bale, a wire twister for connecting the ends of the wire, a cam bar actuated by the plunger for moving the needle into a retracted position, means under yielding strain to move into the path of the cam bar and be operated thereby to project the needle, said means arranged to be moved into an inoperative position by the cam bar during its movement to retract the needle, a latch for holding said means in an inoperative position, and automatic means for releasing the latch.

9. In a press of the kind described, the combination with a frame having a compression chamber, of a reciprocating plunger mounted in said chamber, an oscillatory needle for carrying a wire in the path of the compression stroke of the plunger and over a finished bale, a wire twister for connecting the ends of the wire, a cam bar actuated by the plunger for moving the needle into a retracted position, means under yielding strain to move into the path of the cam bar and be operated thereby to project the needle, said means arranged to be moved into an inoperative position by the cam bar during its movement to retract the needle, a latch for holding said means in an inoperative position, and means actuated by the movement of a bail in the compression chamber for releasing the latch.

In testimony whereof I affix my signature in presence of two witnesses.

CHARLES HENRY DAVIS.

Witnesses:
M. N. BRATHOVDE,
H. R. MILSTAD.